(12) United States Patent
Mavier et al.

(10) Patent No.: US 9,162,773 B2
(45) Date of Patent: Oct. 20, 2015

(54) AIRCRAFT COMPRISING A REVERSIBLE ROTARY ELECTRICAL MACHINE

(75) Inventors: Jérôme Mavier, Toulouse (FR); Etienne Foch, Toulouse (FR); Jean-Louis Lando, Saverdun (FR); Xavier Roboam, Colomiers (FR); Jan Barkowsky, Schwerin (DE)

(73) Assignees: AIRBUS OPERATIONS SAS, Toulouse (FR); AIRBUS OPERATIONS GmbH, Hamburg (DE)

( * ) Notice: Subject to any disclaimer, the term of this patent is extended or adjusted under 35 U.S.C. 154(b) by 1151 days.

(21) Appl. No.: 12/967,765

(22) Filed: Dec. 14, 2010

(65) Prior Publication Data
US 2012/0146403 A1  Jun. 14, 2012

(51) Int. Cl.
*B60L 1/00* (2006.01)
*B64D 41/00* (2006.01)

(52) U.S. Cl.
CPC ....................................... *B64D 41/00* (2013.01)

(58) Field of Classification Search
USPC .......................................................... 62/239
See application file for complete search history.

(56) References Cited

U.S. PATENT DOCUMENTS

| | | | |
|---|---|---|---|
| 6,189,324 B1 * | 2/2001 | Williams et al. | 62/172 |
| 7,578,136 B2 * | 8/2009 | Derouineau et al. | 62/172 |
| 8,006,788 B2 * | 8/2011 | Soma et al. | 180/65.29 |
| 8,475,328 B2 * | 7/2013 | Rouis et al. | 477/3 |

* cited by examiner

*Primary Examiner* — Rexford Barnie
*Assistant Examiner* — Daniel Kessie
(74) *Attorney, Agent, or Firm* — Oblon, McClelland, Maier & Neustadt, L.L.P.

(57) ABSTRACT

The invention concerns an aircraft comprising a reversible rotary electrical machine 30), a wheel (35) for imparting movement to a stream of air, linked to said machine (30), a first ventilation duct (10, 15) configured to supply said wheel (35) with air, an electricity distribution network (70), a reversible power converter (40) connected to said machine (30) and to said network (70), and a control circuit (50) configured to control said converter (40) for, in a motor operating mode of said machine (30), taking a supply current from said network (70) to supply said machine (30) and drive said wheel (35), and, in an alternator operating mode of said machine (30), in which a stream of air flows in said first ventilation duct (15) and imparts movement to said wheel (35), to provide supply power to said network (70) which is generated by said machine (30) driven by said wheel (35).

12 Claims, 4 Drawing Sheets

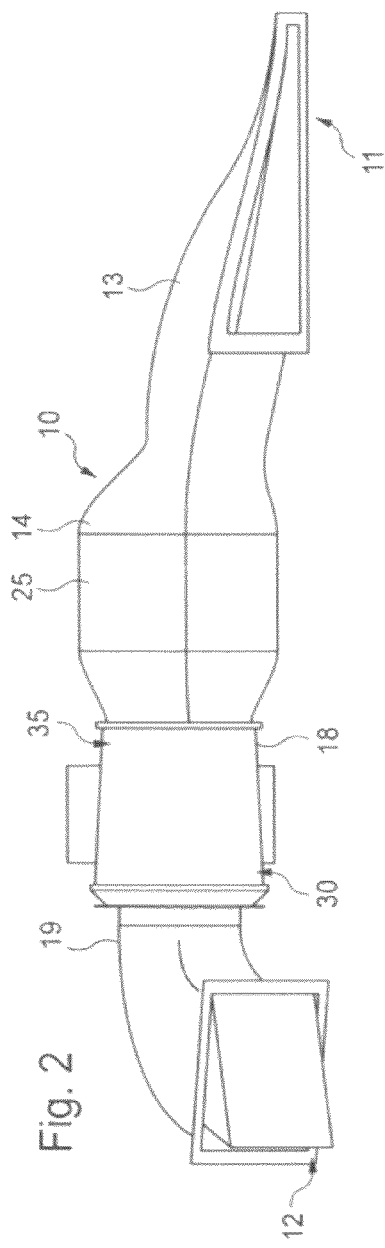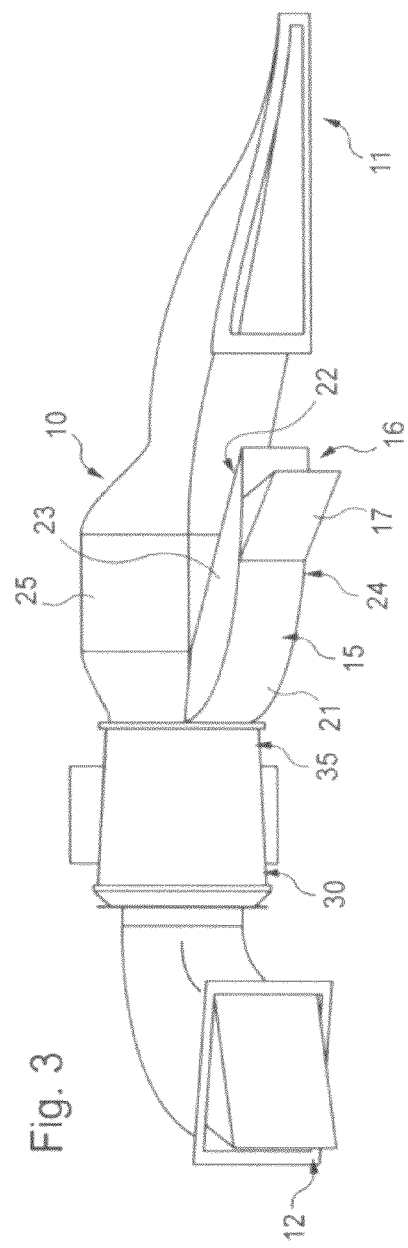

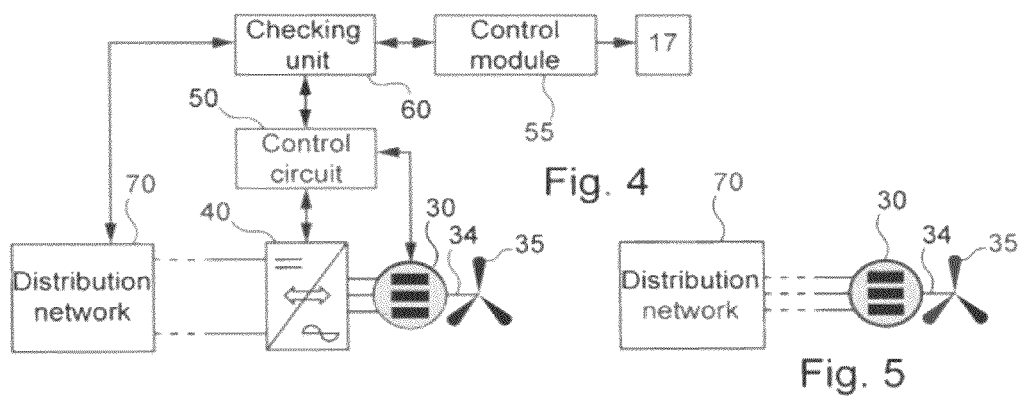
Fig. 4
Fig. 5
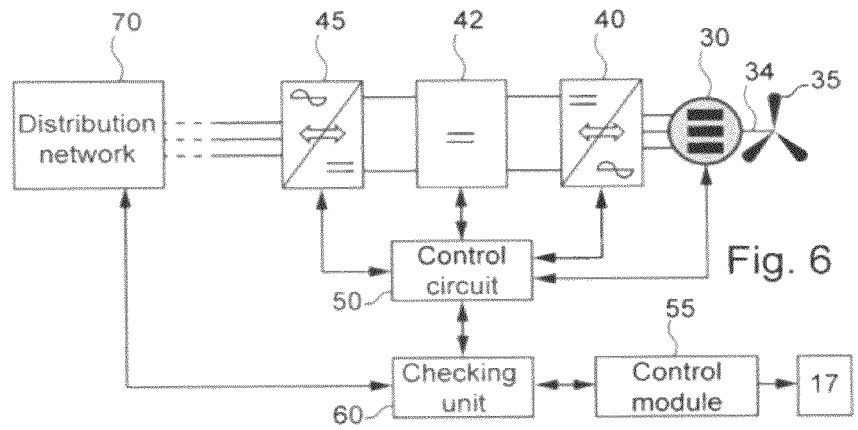
Fig. 6

AIRCRAFT COMPRISING A REVERSIBLE ROTARY ELECTRICAL MACHINE

The invention relates to aircraft comprising a reversible rotary electrical machine operating in particular as a fan in its motor mode.

It is known that aircraft comprise numerous on-board equipment which consume electrical energy, even increasingly so. It is necessary, in normal operation of an aircraft, to generate a sufficient quantity of electrical energy when the aircraft is in a flight phase, during the take-off and landing phases, but this is also so in case of emergency, that is to say in what is referred to as emergency operation.

For this, it is known to adapt the specification of an electric current generator driven by a shaft coupled to an engine of the aircraft. This generator, also termed "Auxiliary Power Unit" (APU), is a turbine supplied with the fuel of the aircraft, whose role is to supply electrical energy and also to supply high temperature compressed air used either to start the engines, or for air conditioning or pressurization of the aircraft.

A generator dedicated to emergency operation is generally installed in the aircraft, and it is possible to adapt its specifications.

Energy storage modules are furthermore installed within the aircraft, generally linked to an electricity distribution network of the aircraft. These modules are for example formed by batteries and/or capacitors.

The generator and the modules make it possible to supply the required quantity of electrical energy to the consumers of the aircraft.

The invention aims to provide an aircraft capable of generating a sufficient quantity of electrical energy simply, conveniently and economically.

For this, the invention concerns an aircraft comprising:
- at least one rotary electrical machine;
- at least one wheel for imparting movement to a stream of air, linked to said at least one rotary electrical machine;
- at least one system to cool;
- at least one first ventilation duct configured to supply said wheel with air;
- an electricity distribution network;
- at least one power converter connected to said at least one rotary electrical machine and to said electricity distribution network and
- at least one control circuit configured to control said at least one power converter;
- said at least one rotary electrical machine is reversible and said at least one power converter is reversible, said at least one control circuit being configured to control said at least one reversible power converter for:
  - in a first motor operating mode of said at least one reversible rotary electrical machine, taking a supply current from said electricity distribution network to electrically supply said reversible rotary electrical machine and thereby drive said at least one wheel for imparting movement to a stream of air, by virtue of which said at least one system to cool is cooled; and
  - in a second alternator operating mode of said at least one reversible rotary electrical machine, in which a stream of air flows in said at least one first ventilation duct and imparts movement to said at least one wheel, providing supply power to said electricity distribution network, which power is generated by said reversible rotary electrical machine which is driven by said wheel.

By virtue of the invention, additional electrical energy is received without having to raise the specifications for the generator, and/or without having to add energy storage modules.

Advantageously, rather than supplying more electrical energy to the distribution network, it is possible to reduce the specifications of that generator and/or eliminate energy storage modules, for the same quantity of electrical energy supplied to the network.

By virtue of the invention, it is even possible to eliminate a generator dedicated to emergency operation.

Furthermore, the use of rotary electrical machines present in the aircraft enables very economical production of electrical energy, of course provided that those machines do not have a coefficient of use equal to 1 (that is to say provided they are not, without counting the phases of electrical energy generation according to the invention, already in motor operation all the time).

These rotary electrical machines operate in motor mode, that is to say as a fan for cooling a system to cool, for example only in phases of take-off, landing, and low altitude flight, in other words when the rate of flow of air entering a ventilation duct in which that system is installed is insufficient for that system to be able to cool without the assistance of the fan. The rest of the time, those rotary electrical machines may operate as an alternator in order to supply the distribution network with electrical energy.

According to a preferred feature, said at least one first ventilation duct comprises a device for regulating the rate of flow of the stream of air entering that first duct.

The first duct advantageously enables the wheel to be directly supplied with the air, which is at a sufficient pressure to drive the reversible rotary electrical machine and so generate electrical energy.

According to another preferred feature, the aircraft comprises a control module configured to control said device for regulating the rate of flow of the stream of air entering said first duct, by virtue of which said regulating device is able to minimize the rate of flow of air in motor mode and adapt or even maximize the rate of flow of air in alternator mode, depending on the need for energy in the network.

Advantageously, this regulating device makes it possible to adapt, or even maximize, the rate of flow of air passing within the first duct and supplying the wheel. Thus, the electrical power generated by the rotary electrical machine may be adapted, or even maximized, simply and conveniently.

According to preferred features of the aircraft according to the invention that are simple, convenient and economical:
- the aircraft comprises at least one second ventilation duct in which are disposed said at least one reversible rotary electrical machine and at least partially said at least one system to cool; and
- the first ventilation duct is juxtaposed against said second ventilation duct and comprises an air inlet and an opposite air outlet, which air outlet discharges into said second ventilation duct.

Advantageously, the air supplying the wheel is conveyed both by the first ventilation duct and by the second ventilation duct.

According to another preferred feature, the aircraft comprises at least one energy storage module electrically connected to said electricity distribution network.

Thus, the electrical energy generated by the reversible rotary electrical machine is sent either directly to the electricity distribution network, or to the energy storage module.

According to other preferred features of the aircraft according to the invention that are simple, convenient and economical:

- at least one control circuit is configured to control the power delivered by said at least one reversible rotary electrical machine by adapting the current passing through at least one reversible converter;
- at least one control circuit is configured to control the voltage supplied by at least one reversible converter to said electricity distribution network;
- at least one control circuit is configured to control the current supplied by at least one reversible converter to said electricity distribution network, by virtue of which said at least one rotary electrical machine acts as a source of current;
- the aircraft comprises a d.c./d.c. type electrical energy coupling device disposed between a first reversible converter and a second reversible converter, said first reversible converter being connected to said at least one reversible rotary electrical machine and said second reversible converter being connected to said distribution network, said at least one control circuit being configured to control the voltage supplied by said d.c./d.c. type electrical energy coupling device to said second reversible converter;
- the aircraft comprises at least one energy storage module connected to the distribution network and to said at least one reversible converter, and a checking unit which is configured to check said at least one control circuit, said checking unit furthermore being configured to check the voltage at the terminals of said at least one energy storage module.
- the checking unit is configured to check the quantities of current entering and current leaving said at least one energy storage module; and
- the distribution network transports alternating or direct current electrical energy.

The control circuit and the checking unit are adapted to control and/or check, for example the reversible power converter, according to different energy management strategies.

According to still another preferred feature, at least one reversible rotary electrical machine operates in alternator mode when the aircraft is in what is referred to as emergency operation.

In this emergency operation, one or more reversible rotary electrical machines may generate and supply part of or all the required electrical energy.

If only part of the energy is supplied, the rest of the required energy may be supplied for example by one or more energy storage modules.

It is thus possible to reduce the specifications of the generator dedicated to the emergency operation, or even to eliminate it. According to still another preferred feature, the system to cool is a heat exchanger.

This heat exchanger is used for cooling a fluid (air or liquid) flowing in a cooling system integrated into the aircraft, which system is adapted to cooperate with air conditioning of the aircraft, or to cool consumers of electricity.

The disclosure of the invention will now be continued with the description of an example embodiment, given below by way of illustrative and non-limiting example, with reference to the accompanying drawings, in which:

FIG. 2 is a perspective view of a main ventilation duct;

FIG. 3 is a perspective view of the main ventilation duct against which is juxtaposed a dedicated ventilation duct;

FIG. 4 is a diagrammatic view of the electrical circuit of the aircraft according to a first example embodiment of the invention; and FIGS. 5 to 8 are diagrammatic views of the electrical circuit of the aircraft according to five other example embodiments of the invention.

Figure 1:
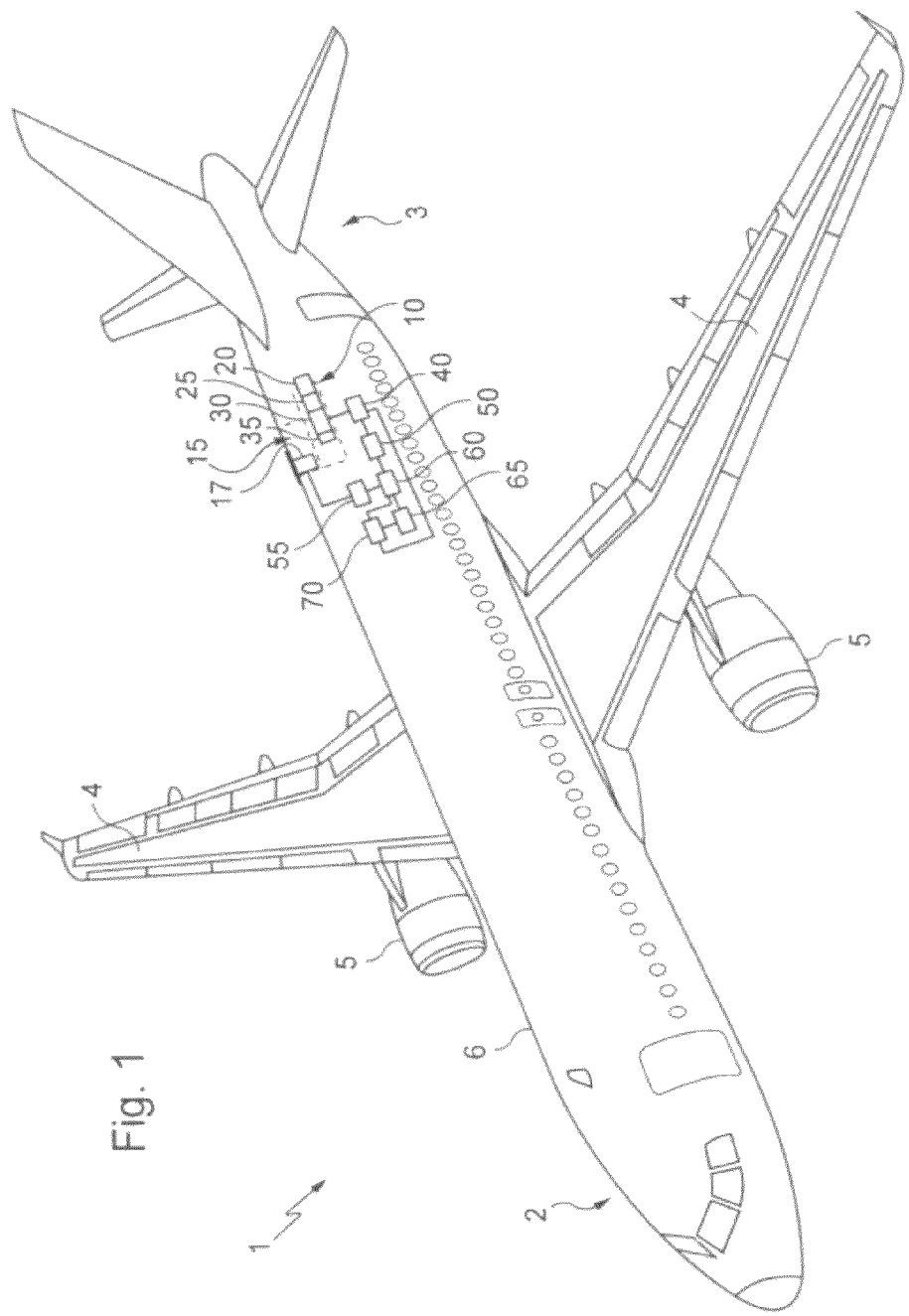
FIG. 1 is a diagrammatic perspective view of an aircraft.

FIG. 1 illustrates an aircraft 1 provided with a fuselage 6, which has a front part 2 and a rear part 3, wings 4 each of which is attached to the fuselage 6 at a central part thereof, and two engines 5, each of those engines 5 being attached to a lower wall of a respective wing 4 and extending from the respective wing 4 parallel to the fuselage 6 towards the front part 2 of the aircraft 1.

This aircraft 1 further comprises, in the rear part 3 of its fuselage 6, a main ventilation duct 10 and a dedicated ventilation duct 15 which is juxtaposed against the main ventilation duct 10.

In the rear part 3 of its fuselage 6, the aircraft 1 further comprises an integrated system 20 for cooling a fluid adapted to supply for example an air conditioning system of the aircraft 1 and/or adapted to cool electrical consumers.

This integrated cooling system 20 is partially disposed in the main ventilation duct 10.

The aircraft 1 further comprises a heat exchanger 25 situated in the vicinity of the integrated cooling system 20 and which is adapted to cool the fluid passing in that cooling system 20 by virtue of the circulation of that fluid through the heat exchanger 25.

The heat exchanger 25 is disposed within the main ventilation duct 10.

The aircraft 1 further comprises a reversible rotary electrical machine 30 situated in the vicinity of the heat exchanger 25 and disposed within the main ventilation duct 10.

This reversible rotary electrical machine 30 comprises a rotor (not shown) able to turn about a longitudinal axis so as to drive an output shaft 34 (FIGS. 4 to 9), and a stator (not shown) mounted around the rotor.

The longitudinal axis constitutes the output shaft and the rotational axis of the rotor of the reversible rotary electrical machine 30.

The aircraft 1 further comprises a wheel 35 for imparting movement to a stream of air, which is mounted on the output shaft 34 of the reversible rotary electrical machine 30, externally thereof.

The wheel 35 has a set of blades whose free end substantially follows the profile of the inner surface of the main ventilation duct 10.

The wheel 35 is thus here disposed within that main ventilation duct 10.

The assembly formed by the reversible rotary electrical machine 30 and the wheel 35 for imparting movement to a stream of air forms a fan adapted to send cold air (by extraction or blowing) in the direction of the heat exchanger 25 in order to cool it.

In this case, it is the reversible rotary electrical machine 30 which is electrically supplied and which drives the wheel 35 to impart movement to a stream of air.

In addition to rotationally driving the wheel 35 to impart movement to a stream of air in the direction of the heat exchanger 25 (motor mode), the reversible rotary electrical machine 30 is capable of being rotationally driven by that wheel 35, itself driven by a stream of air passing in the dedicated ventilation duct 25, to produce electrical energy (alternator mode).

For this, the aircraft 1 further comprises an electricity distribution network 70 connected to the reversible rotary electrical machine 30.

The aircraft 1 also comprises a checking unit 60, a control circuit 50 as well as a reversible power converter 40.

The reversible power converter 40 is connected to the rotary electrical machine 30, to the control circuit 50 and to the electricity distribution network 70.

The control circuit 50 is furthermore connected to the checking unit 60.

This checking unit 60 is furthermore connected to the electricity distribution network 70.

The aircraft 1 further comprises energy storage modules 65 connected to the checking unit 60 and also connected to the electricity distribution network 70.

These energy storage modules 65 comprise for example a supply battery (of Nickel-Cadmium type), and/or a plurality of capacitive cells for forming at least one supercapacitor, or even several of them in parallel.

The dedicated ventilation duct 15 has a device for regulating the rate of flow of air entering that duct 15.

The aircraft 1 further comprises a control module 55 adapted to control the regulating device 17 of the duct 15.

This control module 55 is connected to the checking unit 60.

The checking unit 60 here forms a part of a main checking unit of the aircraft 1.

FIG. 2 illustrates the main ventilation duct 10 in isolation with, inside it, the heat exchanger 25, the reversible rotary electrical machine 30 and the wheel (not visible in that Figure).

This main ventilation duct 10 comprises an air inlet 11 and an air outlet 12 which are formed in the fuselage 6 of the aircraft 1, that air inlet 11 being directed towards the lower part 2 and the air outlet 12 being directed towards the rear part 3.

This air inlet 11 of the main ventilation duct 10 has a curved form which diverges towards the inside of that main duct 10, well-know under the name NACA type air inlet.

This main ventilation duct 10 has a first section 13 extending from the air inlet 11, that first section having a flared shape up to a second section 14 which is widened relative to the first section 13.

In that second section 14 the heat exchanger 25 is disposed.

This main ventilation duct 10 furthermore has a third section 18 which is narrowed relative to the second section 14, the reversible rotary electrical machine 30 and the wheel 35 being disposed in that third section 18.

The main ventilation duct 10 has a fourth section 19 extending from the third section 18 to the air outlet 12, this fourth section again being narrowed relative to the third section and moreover being bent.

FIG. 3 illustrates this same main ventilation duct 10 with in addition the dedicated ventilation duct 15 juxtaposed against the main ventilation duct 10.

This dedicated ventilation duct 15 has an air inlet 16 and an air outlet (which is not shown) which discharges directly into the main ventilation duct 10 at the junction between the second section 14 and the third section 18, in other words at the location of the wheel 35 joined to the shaft 34 of the reversible rotary electrical machine 30.

The dedicated ventilation duct 15 has a first wall 22 which is flat and disposed facing the first and second sections 13 and 14 of the main ventilation duct 10, that first wall 22 extending between the air inlet 16 and the air outlet (not shown) of that dedicated ventilation duct 15.

The dedicated ventilation duct 15 furthermore has a second wall 21 which curves away from the first wall 22 and extends between the air inlet 16 and the air outlet (not shown) of the dedicated duct 15.

The dedicated ventilation duct 15 furthermore has a third wall 23 and a fourth wall 24 facing each other and connecting the first wall 22 and the second wall 21, its third and fourth walls 23, 24 being flat.

The dedicated ventilation duct 15 further comprises, at the location of its air inlet 16, a movable door 17.

This movable door 17 is connected to one end of the second wall 21 at the location of the air inlet 16, and to the flat third and fourth walls 23, 24.

The door 17 is movable so as to regulate the rate of flow of the stream of air entering through that air inlet 16.

FIG. 4 diagrammatically and partially illustrates a first example embodiment of the electrical circuit of the aircraft 1.

The reversible rotary electrical machine 30 is mechanically linked to the wheel 35 by the shaft 34.

The reversible rotary electrical machine 30 is of three-phase type, each of its phases being electrically connected to the reversible power converter 40.

This reversible converter 40 is capable of operating as a rectifier, that is to say to convert electrical energy of alternating type into electrical energy of direct type (AC/DC), and as an inverter, that is to say to transform electrical energy of direct type into electrical energy of alternating type (DC/AC).

As already indicated, this reversible converter 40 is electrically connected to the electricity distribution network 70 of the aircraft 1.

The electricity distribution network 70 is electrically connected to the checking unit 60, which is furthermore electrically connected to the control module 55 which is adapted to control the movable door 17 of the dedicated ventilation duct 15.

The checking unit 60 and the converter 40 are both electrically connected to the control circuit 50.

The control circuit 50 is furthermore electrically connected to the reversible rotary electrical machine 30.

The checking unit 60 sends and receives information to and from the distribution network 70, the control module 55 of the control circuit 50, and also the main checking unit (not shown) of the aircraft 1.

The control module 55 sends and receives information to and from the checking unit 60, and sends the information to the movable door 17 for its movement in order to regulate the rate of flow of the air entering by the air inlet 16 of the dedicated ventilation duct 15.

The control circuit 50 receives and sends information respectively to and from the checking unit 60, the reversible converter 40 and the reversible rotary electrical machine 30.

The reversible converter 40 is adapted to electrically transfer energy, through conversion, between the reversible rotary electrical machine 30 and the distribution network 70.

The reversible rotary electrical machine 30, as previously indicated, is adapted to be supplied by the electricity distribution network 70 via the reversible converter 40 to rotationally drive its shaft 34 and thereby rotationally drive the wheel 35. When appropriate, the reversible rotary electrical machine 30 operates in motor mode.

This reversible rotary electrical machine 30 is furthermore adapted to be driven by its shaft 34, which is first driven by the wheel 35. When appropriate, the reversible rotary electrical machine 30 operates in alternator mode, that is to say that it generates alternating current electrical energy on those three phases which is converted into direct current electrical energy by the reversible converter 40 then transferred to the electricity distribution network 70, which conveys it to the consumers and/or to the energy storage module 65.

The control module is adapted to control the reversible power converter 40 depending on the mode of operation imposed on the reversible rotary electrical machine 30.

The control circuit 50 receives commands from the checking unit 60.

The control module 55 itself is adapted to control the movement of the movable door 17. The control module 55 receives commands from the checking unit 60.

With reference to FIG. 3, a description will now be given of the routing of the stream of air passing through the main ventilation duct 10 and in the dedicated ventilation duct 15, according to the mode of operation of the reversible rotary electrical machine 30.

Generally, and in particular when the aircraft 1 is in a high altitude flight phase, an air stream enters the main ventilation duct 10 via the air inlet 11, which air stream enables the heat exchanger 25 to be cooled directly.

In this case, the reversible rotary electrical machine 30 operates in its alternator mode, with the movable door 17 being moved to create a stream of air having a sufficient rate of flow entering by the air inlet 16 and passing through the dedicated ventilation duct 15 to the air outlet (not shown), to finally supply the wheel 35 to make it turn. When appropriate, the wheel 35 drives the reversible rotary electrical machine 30 mechanically which generates additional electrical energy provided to the electricity distribution network 70.

The door 17 is operated by the control module 55 so as to adapt, or even maximize, the rate of air flow when the reversible rotary electrical machine 30 operates in alternator mode, and to minimize it, or even eliminate it, when the reversible rotary electrical machine 30 operates in motor mode.

To be precise, depending on the rate of flow of air entering the dedicated ventilation duct 15, and thus supplying the wheel 35, the electrical power which can be generated by the reversible rotary electrical machine 30 varies. Of course, the higher the rate of air flow, the higher the power that can be generated, and conversely.

Thus, depending on the need for electrical energy of the electricity distribution network 70 (that is to say the electrical power absorbed by that network 70), the checking unit 60 sends commands to the control module 55 which transforms them into data for moving the movable door 17.

Of course, the power generated by the reversible rotary electrical machine 30 is directly adjustable by control of that machine 30, where the door 17 has two modes, referred to as all or nothing, that is to say if it is open or closed.

In what is referred to as an emergency operating mode, it is also necessary to make the reversible rotary electrical machine 30 operate in its alternator operating mode.

Furthermore, by virtue of the electrical energy produced by the reversible rotary electrical machine 30, it is possible to reduce the specifications of the main generator and/or of the emergency generator and/or to eliminate the energy storage modules installed in the aircraft 1.

When the aircraft is in a low altitude flight phase, in other words at an altitude not making it possible to have a stream of air flowing in the main ventilation duct 70 with a sufficient rate of flow to cool the heat exchanger 25 through which that air passes, and when the aircraft 1 is in take-off or landing phase, the heat exchanger 25 must furthermore be cooled by virtue of the fan formed by the wheel 35 associated with the reversible rotary electrical machine 30, which operates in motor mode.

When appropriate, the reversible rotary electrical machine 30 rotationally drives the wheel 35 which imparts movement to a stream of air within the main ventilation duct 10, which stream is directed towards the heat exchanger 25 for it to be cooled.

A description will now be made with reference to FIG. 4 of the implementation of the management of the energy provided to the electricity distribution network 70 in the particular case in which the reversible rotary electrical machine 30 operates in alternator mode.

This reversible rotary electrical machine 30 operates as an alternator and is thus considered as a source of electrical energy. However, within the aircraft 1, there are generally other sources of electrical energy operating simultaneously (main and/or emergency energy sources)

It is preferable for a single source of energy to check the level of voltage on the electricity distribution network 70, the other energy sources being power-regulated (that is to say with a current loop).

It may also be that the checking unit 60 is adapted to supervise all the energy sources of the aircraft 1 when they operate simultaneously, which checking unit 60 would where appropriate check the level of voltage on the electricity distribution network 70.

When the electricity distribution network 70 delivers direct current electrical energy, in the case where the amplitude of the voltage on that network 70 is already regulated by a main power source (for example via the checking unit 60), the control circuit 50 is adapted to perform current control of the reversible converter 40 operating as a rectifier via a control loop making it possible to control the torque of the shaft 34 of the reversible rotary electrical machine 30 (or of the rotor, or of the wheel 35), or the speed of the shaft 34 or directly to control the power delivered by the reversible rotary electrical machine 30.

When no main energy source other than the reversible rotary electrical machine 30 operating in alternator mode checks the amplitude of the voltage on the electricity distribution network 70, the control circuit 50 is then adapted to control the amplitude of the voltage delivered by the reversible converter 40 operating as a rectifier on the electricity distribution network 70, via an external control loop.

FIG. 5 illustrates a second diagrammatic example of a circuit of the aircraft 1.

In this example, the reversible rotary electrical machine 30 is directly connected to the electricity distribution network 70, which is adapted to transport alternating current electrical energy.

No power converter is necessary between the network 70 and the machine 30.

Where appropriate, the reversible rotary electrical machine 30 acts as a source of current directly connected to the network 70.

FIG. 6 illustrates a third diagrammatic example of a circuit of the aircraft 1.

The difference in the diagrammatic electrical circuit of FIG. 6 relative to that of FIG. 4 lies in the fact that the electricity distribution network 70 now transports alternating rather than direct current electrical energy.

Furthermore, the power stage formed by the reversible converter 40 in FIG. 4 is now formed by two reversible converters 40 and 45 as well as an electrical energy coupling device forming a reversible converter of d.c./d.c. type.

The reversible rotary electrical machine 30 is now connected to the first reversible converter 40, which is electrically connected to device 42.

The electricity distribution network 70 is now connected to the second reversible converter 45, which is furthermore electrically connected to the device 42.

The reversible power converters 40 and 45 are capable of operating as rectifiers and as inverters.

The device 42 comprises a filter, of low-pass type, and enables the transfer to be made between the direct current electrical energy delivered by the respective reversible converter 40, 45 and supplied to the respective reversible converter 45, 40.

In this example, the control circuit 50 is electrically connected to each of the converters 40 and 45 and to the device 42.

The control circuit 50 is adapted to control at the same time the reversible converter 40, the reversible converter 45 and the device 42.

The operation of this electrical circuit will now be described.

Where the amplitude and the frequency of the alternating voltage are controlled on the electricity distribution network 70 by a main power source, the power stage which converts the alternating current electrical energy supplied by the reversible rotary electrical machine 30 into alternating current electrical energy delivered by the reversible converter 45 in the distribution network 70 is regulated in power, in torque or in speed.

For this, the control circuit 50 is adapted to perform current control of the reversible converter 40 operating as a rectifier via a simple control loop so as to control the power delivered (that is to say the torque or the speed of the shaft 34, or directly the power delivered by the machine 30). The control circuit 50 is furthermore adapted to perform voltage control of the device 45 via an external control loop.

The control circuit 50 is also adapted to perform current control of the reversible converter 45 operating as an inverter via an internal control loop.

Where the amplitude and the frequency of the alternating voltage on the electricity distribution network is not regulated by a main energy source, the control circuit 50 is adapted to control the reversible converter 40 and the device 42 in the same way as above.

The control circuit 50 is furthermore adapted to perform current control of the reversible converter 45 operating as an inverter via an internal control loop and the control circuit 50 is adapted to control the amplitude and the frequency of the alternating voltage delivered by that reversible converter 45 via an external control loop.

Figure 7:
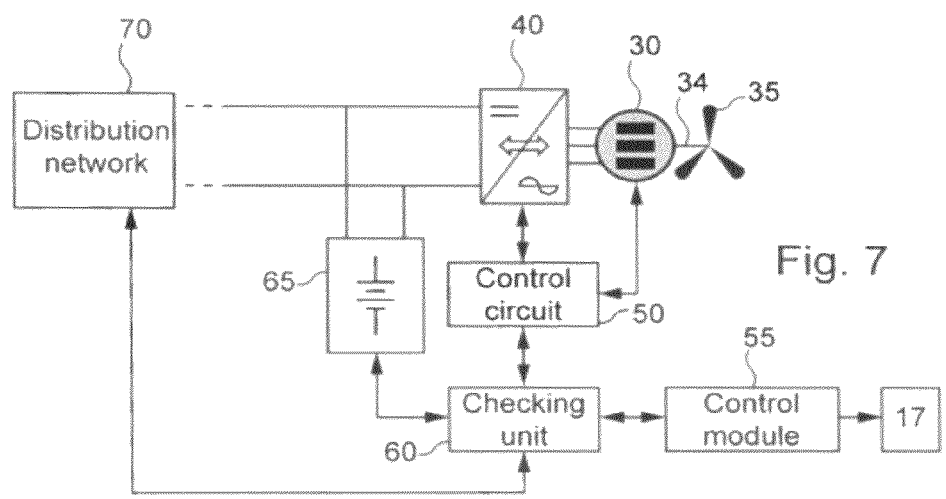

FIG. 7 illustrates a fourth example embodiment of the electrical circuit of aircraft 1, in which an energy storage module 65 is electrically connected in parallel between the electricity distribution network 70 and the reversible converter 40.

This is the only difference compared with the electrical circuit of the first example illustrated in FIG. 4, since the electricity distribution network 70 also transports direct current electrical energy.

This energy storage module 65 comprises a battery, with furthermore one or more supercapacitors.

In this fourth example, in the alternator operating mode of the reversible rotary electrical machine 30, the reversible converter 40 delivers direct current electrical energy directly to the electricity distribution network 70.

A description will now be given of the operation of this electrical circuit, in the case in which no other main energy source controls the amplitude of the voltage on the electricity distribution network 70.

The management of the electrical energy generated by the reversible rotary electrical machine 30 and by the energy storage module 65 in parallel depends on the power absorbed by the electricity distribution network 70.

This quantity of absorbed power may be measured directly on the network 70 by virtue of a voltage measurement, and/or by other measurements of current which may facilitate the management of energy.

When the energy storage module 65 acts as a source of voltage when the power absorbed on the network 70 is greater than the maximum power which can be supplied by the reversible rotary electrical machine 30, two energy management strategies are possible depending on the quantity of power really absorbed.

If the power really absorbed on the network 70 is less than the maximum power that the reversible rotary electrical machine 30 can generate, that machine 30 alone generates the electrical energy required by the network 70, without assistance from the energy storage module 65.

The reversible rotary electrical machine 30 and the converter 40 thus act together as a voltage source.

Where appropriate, the control circuit 50 is adapted to perform current control of the reversible converter 40 acting as a rectifier via an internal control loop so as to control the torque on the shaft 34, and the control circuit 50 is furthermore adapted to control the amplitude of the voltage delivered by the reversible converter 40 to the network 70 via an external control loop.

If the power really absorbed by the network 70 is greater than the maximum power which the reversible rotary electrical machine 30 can generate, the machine 30 generates its maximum power and the energy storage module 65 supplies the rest of the power required to attain the power really absorbed by the network 70.

Where appropriate, the reversible rotary electrical machine 30 acts as a current source, and the control circuit 50 is adapted to perform current control of the reversible converter 40 via a single control loop. This regulation in fact corresponds to regulating the machine 30 to its maximum power value.

The energy storage module 65 furthermore acts as a voltage source.

Where appropriate, the checking unit 60 is adapted to control the amplitude of the voltage supplied to the distribution network 70 via a control loop, and checking unit 60 is optionally adapted to check the quantity of current entering and leaving the energy storage module 65 so as to monitor its state of charge.

In this fourth embodiment, it is also possible for the energy storage module 65 to continuously act as a voltage source, and two strategies may then be envisaged depending on the power really absorbed on the distribution network.

If the power really absorbed on the network 70 is less than the maximum power which the reversible rotary electrical machine 30 can generate, the energy storage module 65 then acts as a component through which the power delivered by that machine 30 transits.

Where appropriate, the checking unit 60 is adapted to check the amplitude of the voltage at the terminals of the energy storage module 65, which voltage is delivered to electricity distribution network 70.

Optionally, the checking unit 60 is furthermore adapted to check the quantity of current entering and leaving the terminals of the energy storage module 65 so as to check its state of charge.

If the power really absorbed on the electricity distribution network 70 is greater than the maximum power that the reversible rotary electrical machine 30 can generate, the energy storage module 65 supplies, in addition to the power generated by the machine 30, the rest of the power required on the distribution network 70.

In the same way, the checking unit 60 is adapted to check the amplitude of the voltage delivered by the energy storage module 65 to the electricity distribution network 70, and, optionally, to check the quantity of current entering and leaving the terminals of the energy storage module 65 so as to check its state of charge.

Figure 8:
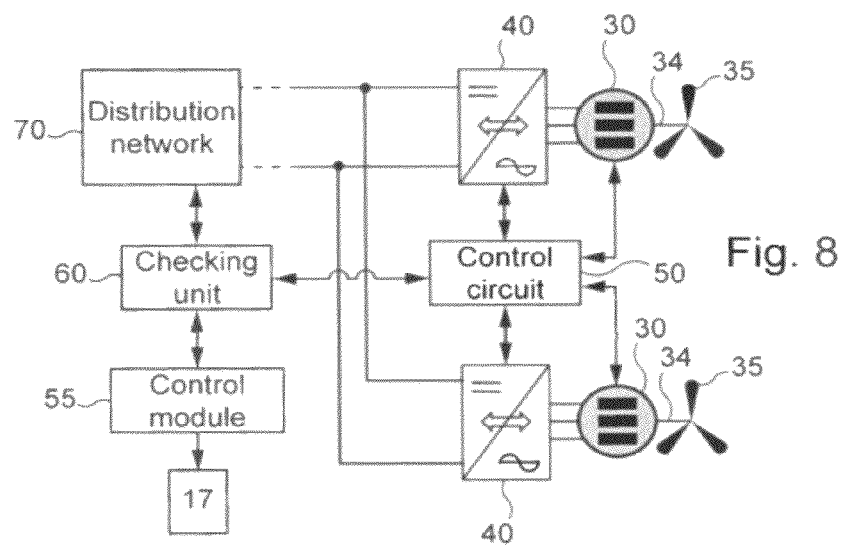

FIG. 8 illustrates a fifth example embodiment of the electrical circuit of the aircraft 1.

Relative to the first example embodiment of the circuit illustrated in FIG. 4, the circuit illustrated in FIG. 9 comprises an additional reversible rotary electrical machine 30 associated with an additional wheel 35 via an additional shaft 34.

Furthermore, that additional rotary electrical machine 30 is electrically connected to an additional reversible converter 40, which is electrically connected in parallel between the electricity distribution network 70 and the reversible converter 40.

In this case there are thus two energy sources disposed in parallel, one being a reference source and the other being additional.

The control circuit 50 is then electrically connected to both reversible converters 40.

The control circuit receives and sends information from and to each of the reversible converters 40.

The operation of this circuit will now be described.

The operation in parallel of the first and second reversible rotary electrical machines 30 depends on the quantity of power really absorbed by the electricity distribution network 70.

Let it be considered that one of the two reversible rotary electrical machines 30 is taken as reference.

If the power really absorbed on the network 70 is less than the maximum power which the reference reversible rotary electrical machine 30 can generate, that machine 30 by itself generates the power really absorbed in order to supply that network 70, without the assistance of the other reversible rotary electrical machine 30, which is thus controlled by the control circuit 50 in order not to supply any energy.

The reference reversible rotary electrical machine 30 thus acts as a source of voltage.

Where possible, the control circuit 50 is adapted to provide current control of the reversible converter 40 associated with that reference machine 30 so as to control the torque or the speed of the shaft 34 of that machine 30, or its power.

Furthermore, the control circuit 50 is adapted to control the amplitude of the voltage delivered by that reversible converter 40 associated with the reference reversible rotary electrical machine 30 via an external control loop.

If the power really absorbed on the distribution network 70 is greater than the maximum power that the reference reversible rotary electrical machine 30 can generate, the latter supplies its maximum power and the rest of the power required is supplied by the other reversible rotary electrical machine 30.

The reference reversible rotary electrical machine 30 thus acts as a source of current, and where appropriate, the control circuit 50 is adapted to provide current control of the reversible converter 40 associated with the reference machine 30, via a single control loop which in fact enables that reference machine 30 to be set to its maximum power value.

The other reversible rotary electrical machine 30 thus acts as a source of voltage and where appropriate, the control circuit 50 is adapted to provide current control of the reversible converter 40 associated with that other machine 30 via an internal control loop, so as to control the torque on its shaft 34.

Furthermore, the control circuit 50 is adapted to control the amplitude of the voltage delivered to the network 70 by the reversible converter 40 associated with the other machine 30, via an external control loop.

To measure the amplitude of the voltage of the electricity distribution network 70, it is possible to make direct measurements of voltage on that network 70, and/or to make additional measurements of current.

A certain number of example embodiments of the electrical circuit of the aircraft 1 have just been described with the associated energy management strategies. It is of course possible to apply other energy management strategies, or to combine them, for example when more than two reversible rotary electrical machines 30 operate in alternator mode simultaneously, with or without an associated energy storage module.

In a variant not illustrated, the aircraft comprises other dedicated ventilation ducts of the same type as that which has just been described, which are each juxtaposed or not juxtaposed against a respective main ventilation duct, those dedicated ventilation ducts being dedicated to the supply air of the reversible rotary electrical machine.

For example, those other dedicated ducts and/or main ducts are installed in the ventral fairing of the aircraft, in the vicinity of the wings, fore or aft of the latter, or those other ducts are installed in the region of the front undercarriage of the aircraft.

In a variant not illustrated, the main ventilation duct and the dedicated ventilation duct are merged. In other words, there is no separate dedicated duct 15, but the main duct alone supplies the wheel 35 with air. As appropriate, the main duct includes or does not include a regulating device as described for the dedicated duct 15, that regulating device being controlled or not controlled by a control module as described above.

In a variant not illustrated, the electrical energy coupling device of d.c./d.c. type comprises, in addition to a filter, a surge limiter and/or a power dissipation unit.

In a variant not illustrated, the electrical energy coupling device comprises an energy storage system connected via a static converter, or uniquely comprises a block of capacitors. In all cases, this device is a filtering component contributing to putting into form the electrical energy processed by the reversible converter 40, and optionally by the reversible converter 45.

In a variant not illustrated, when the reversible rotary electrical machine associated with the wheel operates as a fan, it enables for example a non-pressurized zone to be ventilated to avoid the accumulation of fuel vapor.

In still another variant not illustrated, the control module enabling the regulating device present in the dedicated duct to be acted upon is integrated into the checking unit, and/or the control circuit enabling the reversible power converter to be controlled is integrated into the checking unit.

In still another variant not illustrated, the aircraft comprises an electrical energy control system dedicated to the emergency operation of the aircraft, which, when that emergency operation is triggered, takes control of the checking unit, of the control circuit, as well as of the control module, in order to make available all the functionalities required for implementing that operation.

In still another variant not illustrated, the air inlet 16 of duct 15 is closed, and where appropriate, either the machine 30 is controlled to generate a power residue with the air supplied by duct 10, or the machine 30 is controlled so as not to supply power, or the wheel 35 is mechanically locked.

Of course, the geometry of the rotary electrical machine 30 and/or the wheel 35 and/or duct 10 and/or duct 15 may be modified to improve the aerodynamic performance.

It should be noted more generally that the invention is not limited to the examples described and represented.

The invention claimed is:

1. An aircraft comprising:
    at least one rotary electrical machine;
    at least one wheel for imparting movement to a stream of air, linked to said at least one rotary electrical machine;
    at least one system to cool;
    at least one first ventilation duct configured to supply said wheel with air;
    an electricity distribution network;
    at least one power converter connected to said at least one rotary electrical machine and to said electricity distribution network; and
    at least one control circuit configured to control said at least one power converter;
    at least one second ventilation duct in which are disposed said at least one rotary electrical machine and at least partially said at least one system to cool;
    wherein said at least one rotary electrical machine is reversible and said at least one power converter is reversible, said at least one control circuit being configured to control said at least one reversible power converter for:
    in a first motor operating mode of said at least one reversible rotary electrical machine, taking a supply current from said electricity distribution network to electrically supply said reversible rotary electrical machine and thereby drive said at least one wheel for imparting movement to a stream of air, by virtue of which said at least one system to cool is cooled; and
    in a second alternator operating mode of said at least one reversible rotary electrical machine, in which a stream of air flows in said at least one first ventilation duct and imparts movement to said at least one wheel, providing supply power to said electricity distribution network, which power is generated by said reversible rotary electrical machine which is driven by said wheel,
    wherein said at least one first ventilation duct includes a device for regulating a rate of flow of the stream of air entering that first duct, and the device for regulating is positioned at an entrance to the first ventilation duct, and
    wherein said first ventilation duct is juxtaposed against said second ventilation duct and comprises an air inlet and an opposite air outlet, which air outlet discharges into said second ventilation duct.

2. An aircraft according to claim 1, comprising a control module configured to control said device for regulating the rate of flow of the stream of air entering said first duct, by virtue of which said regulating device is able to minimize the rate of flow of air in motor mode and adapt or even maximize the rate of flow of air in alternator mode, depending on need for energy in the network.

3. An aircraft according to claim 1, comprising at least one energy storage module electrically connected to said electricity distribution network.

4. An aircraft according to claim 1, wherein at least one control circuit is configured to control the power delivered by said at least one reversible rotary electrical machine by adapting the current passing through at least one reversible converter.

5. An aircraft according to claim 1, wherein at least one control circuit is configured to control voltage supplied by at least one reversible converter to said electricity distribution network.

6. An aircraft according to claim 1, wherein at least one control circuit is configured to control current supplied by at least one reversible converter to said electricity distribution network, by virtue of which said at least one rotary electrical machine acts as a source of current.

7. An aircraft according to claim 1, comprising a d.c./d.c. type electrical energy coupling device disposed between a first reversible converter and a second reversible converter, said first reversible converter being connected to said at least one reversible rotary electrical machine and said second reversible converter being connected to said distribution network, said at least one control circuit being configured to control the voltage supplied by said d.c./d.c. type electrical energy coupling device to said second reversible converter.

8. An aircraft according to claim 1, comprising at least one energy storage module connected to the distribution network and to said at least one reversible converter, and a checking unit which is configured to check said at least one control circuit, said checking unit furthermore being configured to check voltage at terminals of said at least one energy storage module.

9. An aircraft according to claim 8, wherein said checking unit is configured to check quantities of current entering and current leaving said at least one energy storage module.

10. An aircraft according to claim 1, wherein said distribution network transports alternating or direct current electrical energy.

11. An aircraft according to claim 1, wherein said at least one reversible rotary electrical machine operates in alternator mode when the aircraft is in what is referred to as emergency operation.

12. An aircraft according to claim 1, wherein said system to cool is a heat exchanger.

* * * * *